Nov. 20, 1945. W. W. HALLINAN 2,389,431
FILTER
Filed April 30, 1942 3 Sheets-Sheet 1

INLET
OUTLET

Inventor.
William W. Hallinan
By McCaleb, Wendt
& Dickinson Attys.

Nov. 20, 1945.  W. W. HALLINAN  2,389,431
FILTER
Filed April 30, 1942   3 Sheets-Sheet 2
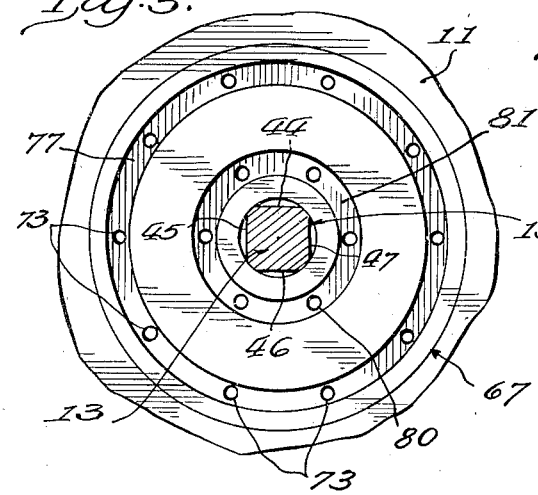
Fig. 3.
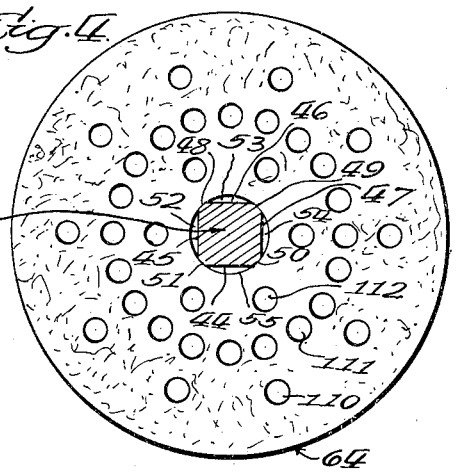
Fig. 4.
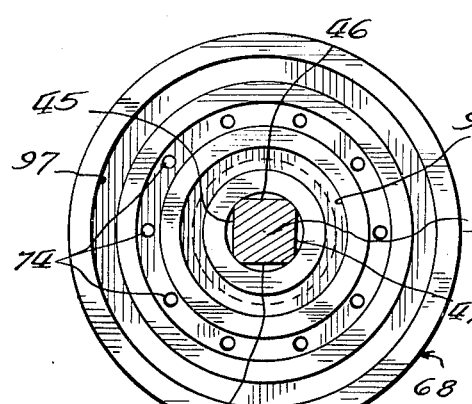
Fig. 5.
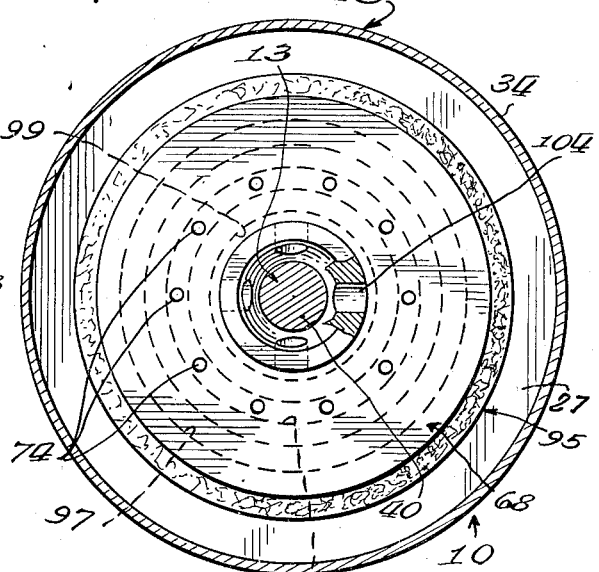
Fig. 6.
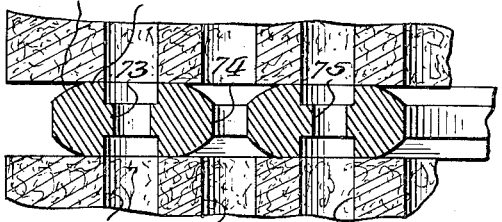
Fig. 7.
Fig. 8.   Fig. 9.
Inventor:
William W. Hallinan
By McCaleb, Wendt
& Dickinson Attys.

Nov. 20, 1945.  W. W. HALLINAN  2,389,431
FILTER
Filed April 30, 1942  3 Sheets-Sheet 3

Inventor:
William W. Hallinan
By McCaleb, Wendt & Dickinson
Attys.

Patented Nov. 20, 1945

2,389,431

UNITED STATES PATENT OFFICE 2,389,431

FILTER

William W. Hallinan, Mendota, Ill.

Application April 30, 1942, Serial No. 441,077

11 Claims. (Cl. 210—183)

The present invention relates to filters, and is particularly concerned with filters which are adapted to be used for filtering liquids, gas, or air.

One of the objects of the invention is the provision of an improved filter of the disc type, which is adapted to be used for filtering and removal of solids from liquids, air, or other gases, and in which the filtering elements are adapted to be replaced with a minimum amount of labor.

Another object of the invention is the provision of an improved filter of the class described which is provided with a greater filtering area and which may be made more compact for the same filtering area than devices of the prior art, so that it is adapted to be used where space is at a premium and may be employed wherever such filters are needed, such as, on automobile engines, oil burners, or humidifying device.

Another object of the invention is the provision of an improved filter of the class described, which is adapted to effect an efficient filtering of liquid or air as long as the filter element is clean, but which is adapted to permit the safety by-pass of the medium which is being filtered, whenever the filter element becomes clogged.

This is of particular importance in connection with automobile engines, where the clogging of the filter element would ordinarily shut off the supply of oil completely to the bearings, to which the conduits are connected, beyond the filter element, while the pressure gauge would continue to show pressure and would be taken as an indication that oil is being supplied to the bearings.

Another object of the invention is the provision of an improved filter structure which is capable of providing a greater filtering surface in a smaller space than the devices of the prior art, and which is less expensive to manufacture, and which utilizes filtering elements that may be stamped or punched out of sheet material by means of a press.

Another object of the invention is the provision of an improved filter structure which is adapted to be cleaned quickly and easily, and provided with new filter elements, and in which the filter elements are made of flat or sheet material that are easily packed and carried by service men, or in which a temporary repair job can be made by cutting out pads from any sheet material, such as cotton or wool felt or cotton or wool cloth.

Another object of the invention is the provision of an improved filter structure by means of which the density of the filter elements may be adjusted so that a loose adjustment may be provided to allow small particles of foreign substances to pass, if they are not liable to cause any damage, and which is still adapted to filter out the larger particles, or which may be adjusted to so increase the density of the filter element that even the smallest particles of foreign substances will be caught in the filter.

Another object of the invention is the provision of an improved filter that can be used for either high or low pressures, and which is so constructed that when the filter element has been caused to accumulate dirt or other solids its edge is forced into a wedging shape to increase the density of the filter element and hold the accumulated dirt firmly, and resist its passage through the filter pad.

Another object of the invention is the provision of an improved filter structure so constructed that it can be cleaned, serviced, or provided with new filter elements, without disturbing the connected inlet and outlet piping connections, and in which one bolt may be used first to hold the filter pads and supporting discs together, and provide the density adjustment; and in addition, the same bolt may be used to hold the sediment chamber or filter cover to the main body.

Other objects and andvantages of the invention will be apparent from the following description and the accompanying drawings, in which similar characters of reference indicate similar parts throughout the several views.

Referring to the three sheets of drawings accompanying this specification:

Fig. 3 is a fragmentary sectional view, taken on the plane of the line 3—3 of Fig. 1, looking in the direction of the arrows, showing the structure of the uppermost plate;

Fig. 4 is a sectional view, taken on the plane of the line 4—4 of Fig. 1, showing the structure of one of the filter elements;

Fig. 5 is a sectional view, taken on the plane of the line 5—5 of Fig. 1, looking in the direction of the arrows, showing the structure of the lowermost baffle plate;

Fig. 6 is a sectional view, taken on the plane of the line 6—6 of Fig. 1, looking in the direction of the arrows, showing the conduits at the lowermost plate and showing the end of the filter assembly in bottom plan;

Fig. 7 is a fragmentary sectional view, showing the shape and arrangement of the apertures in the filter elements and plates;

Fig. 8 is a similar fragmentary sectional view, showing the specific structure of a modified form of spacer plate, which is intended to be used for high filter pressures;

Fig. 9 is a similar fragmentary sectional view of a filter structure adapted to be used for medium filter pressures;

Figure 2:
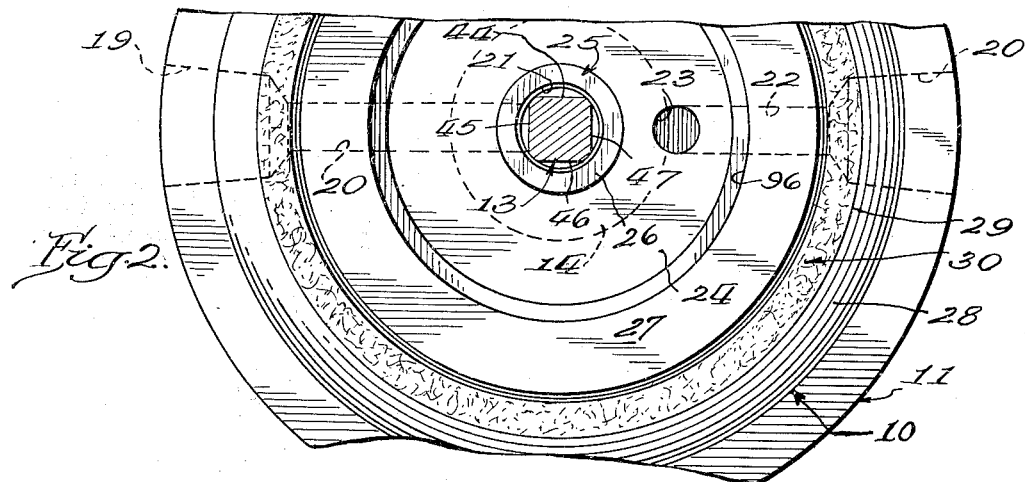
Fig. 2 is a fragmentary sectional view, taken on the plane of the line 2—2 of Fig. 1, looking in the direction of the arrows.
Figure 1:
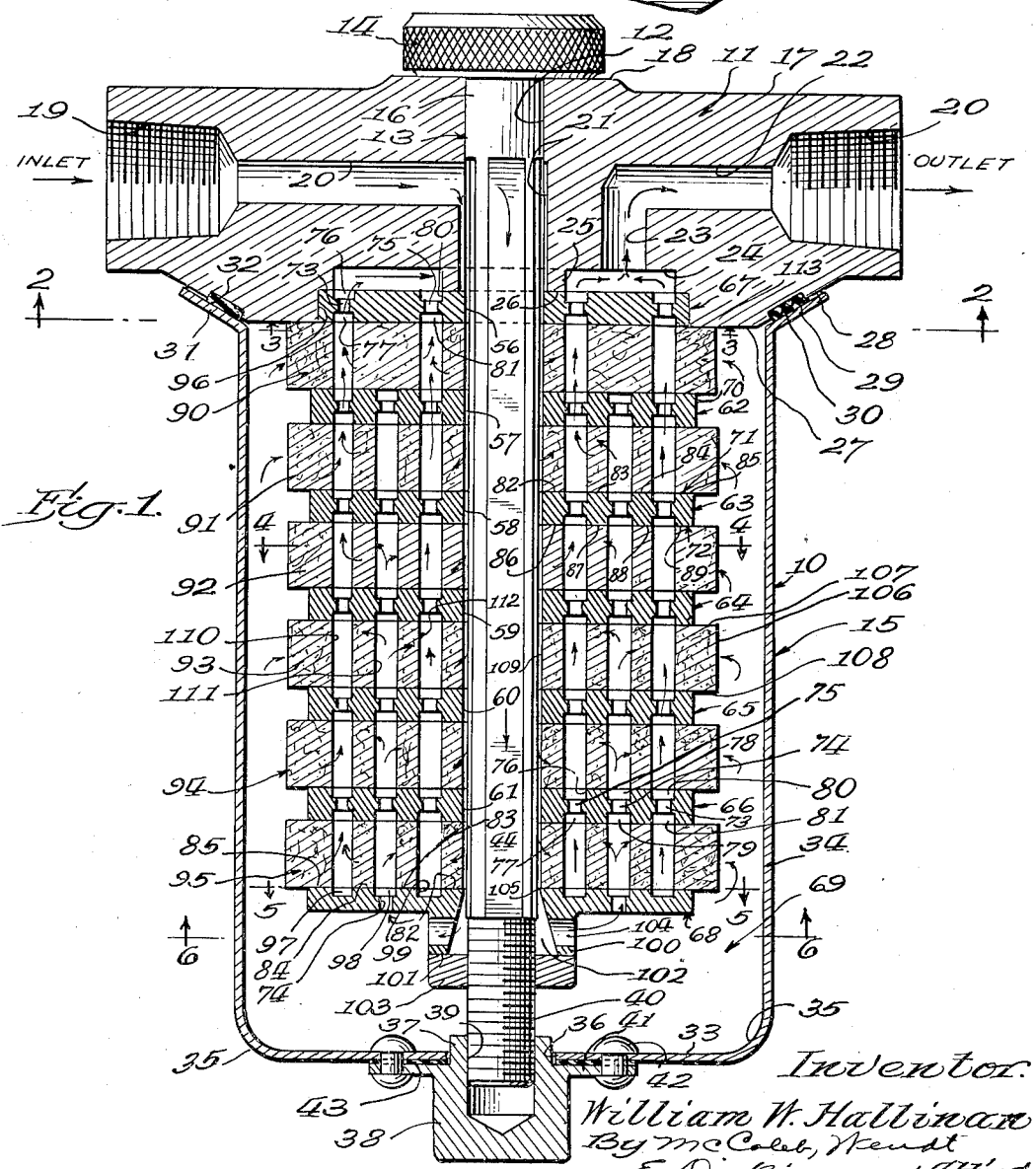
Fig. 1 is an axial sectional view, taken through a filter constructed according to the invention, showing the details of structure and the various paths of the medium passing through the filter, before it is filtered, at the time it is being filtered, and after it has been filtered.
Figure 10:
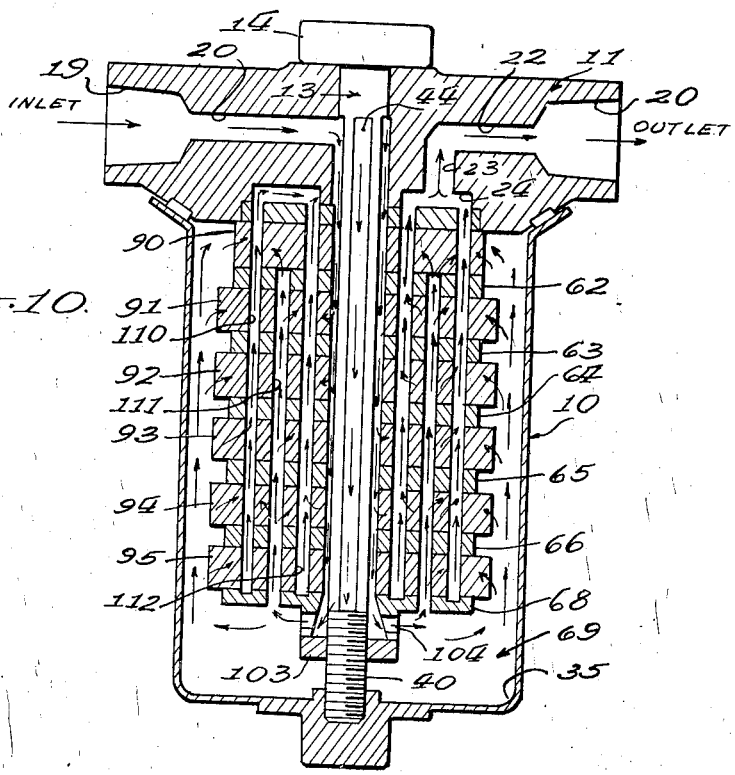
Fig. 10 is a diagrammatic sectional view of the device of Fig. 1, showing the course or flow of the medium to be filtered through the device.

Refering to Figs. 1 and 2, 10 indicates in its entirety the filter unit, the structure of which is best shown in the axial sectional view of Fig. 1.

This unit preferably comprises a supporting body or base 11, which is provided with a centrally located circular bore 12 for receiving a headed bolt 13, serving as a supporting member for the filter assembly.

The bolt 13 is preferably provided with a knurled head 14 so that it may be held with the fingers to prevent rotation when the housing is being secured on the end of the bolt 13.

The shank 16 of the bolt is cylindrical and substantially fits in the cylindrical bore 12. The body 11 may comprise a relatively thick circular body, which may be made of metal, or a suitable plastic or some phenolic condensation compound. The side 17 of the body 11 may be substantially flat, but it is provided with a raised flat surface 18 surrounding the bore 12, which is machined for airtight engagement with the lower flat side of the head 14.

The body 11 is preferably provided with a threaded, slightly tapered bore 19 at one side, and a similar threaded bore 20 at the opposite side, the former serving as an inlet and the latter as an outlet. These threaded bores are adapted to receive the usual threaded pipes.

The inlet 19 communicates with a conduit 20, which communicates with a counterbore 21 slightly larger than the bore 12 and axially located with respect to the bore 12. The outlet 20 communicates with a radially extending conduit 22, which in turn communicates with an axially extending conduit 23 that leads to an annular groove 24 in the lower side of the body 11 (Fig. 1).

The annular groove 24 serves as a liquid or gas collection conduit in connection with the filter assembly so that all of the filtered liquid or gas may collect in the groove 24 and be carried from thence through conduits 23, 22 to outlet 20.

An annular axially extending ridge 25, having a flat lower surface 26, surrounds the counterbore 21 and defines one side of the groove 24. The lower face 27 of the body 11 may take any shape inside the housing 15, and is shown as having a plane surface, but the plane surface 27 preferably leads to a frusto-conical surface 28 having a suitable annular groove 29 for receiving a rubber gasket 30 protruding from the groove 29.

The housing 15 preferably comprises a cylindrical body, which may be made of sheet metal, or cast metal, or may be molded out of a plastic or phenolic condensation compound. The cylindrical housing 15 has its upper end open, this end being closed by means of its engagement with the body 11.

In order to assure a liquid and gas-tight engagement between the housing 15 and the body 11, the housing is provided with an outwardly projecting frusto-conical flange 31, the frusto-conical surface 32 of which engages the rubber gasket 30.

I desire it to be understood that any suitable form of gasket may be employed in connection with a suitable gasket cement that is not soluble in the liquid being filtered.

The lower end 33 of the housing 15 preferably forms an integral part of the cylindrical body 34 of the housing, and is joined thereto by the rounded corner portions 35. The end 33 is formed with a centrally located aperture 36 for passing a complementary part 37 of a threaded member 38 carried by the housing 15. The threaded member 38 may consist of a cylindrical member of cast metal or molded plastic or phenolic condensation compound, but it is preferably of metal, since this member 38 is provided with an internal threaded bore 39 for engaging the threaded end 40 of the bolt 13.

The threaded member 38 has a radially extending flange 41, which engages the outside of the end portion 33 of the housing 15, to which it may be secured by a plurality of through rivets 42, with a gasket 43 interposed between the flange 41 and the end 33, if necessary, to assure liquid-tightness.

In some embodiments of the invention the joint between the outer edge of the flange 41 and the end 33 may be soldered. The bolt 13 is preferably provided with a plurality of flattened portions 44—47 (Fig. 4), which may be arranged like the sides of a square, except that the bolt preferably has small circular portions 48—51 located between these flattened portions 44—47, and the flattened portions begin in the counterbore 21 and extend downward to the threaded portion 40 of the bolt, which is preferably of reduced size.

The counterbore 21 is large enough to permit liquid or fluid to pass in the conduit 20 and around the bolt 13 into all of the conduits 52—55, which are located between the flattened portions 44—47 and the cylindrical apertures 56—61 in the spacer plates 62—66 and the end plates 67, 68. Actually the end plates 67 and 68 are special forms of additional pressure plates.

Thus the conduits 52—55 along the bolt 13 lead from the conduit 20 downward over the full length of the bolt for conducting the medium to be filtered into the chamber 69 in the housing 15.

The spacer plates 62—66 may be similar in shape and construction, and they may be constructed of suitable metal or of some phenolic condensation compound or plastic of suitable strength. Each spacer plate 62—66 may be in the form of discs. Each such disc may have a substantially cylindrical periphery 70, and in the embodiment of Fig. 1, flat upper surface 71 and flat lower surface 72.

The discs are provided with through apertures arranged in series, the series being indicated by the numerals 73, 74, and 75. Each series may consist of a plurality of through apertures located so that their centers are along the line of a circle, the circles being concentric and having their center located at the center of the disc.

The apertures 73 of each series communicate with each other through the annular grooves 76 above the disc and 77 below the disc. Similar concentric grooves 78 and 79 are located above and below the series of apertures 74, and similar grooves 80, 81 are located above and below the series of apertures 75.

The grooves 76—81 effectively divide the upper and lower flat surfaces 71, 72 of the discs into ridges 82—89 (Fig. 1, disc 63).

The ridges 82—89 have at their outer ends the flat surfaces 71, 72, which engage the filter elements, which are indicated by numerals 90—95.

The body 11 is preferably provided with a cylindrical recess 96, which is adapted to receive the uppermost end plate 67, recess 96 being slightly larger than the annular groove 24. The end plate 67 may then be arranged in the recess 96, with its lower end flush with the surface 27.

This end plate differs from the spacer plates 62—66, as follows: It has the same series of through apertures 73, 75, and the corresponding upper and lower grooves 76, 80 and 77, 81, but does not have the through apertures 74 for a purpose further to be described.

The lowermost pressure plate 68 also differs from the spacing plate 66, as it is so constructed that it acts like a baffle and controls the flow of the medium to be filtered from the chamber 69 into the proper apertures of the filter elements.

Thus the lowermost disc 68 may comprise a disc-like metal member, having in its upper surface (Fig. 1) the annular grooves 96, 98, and 99. These grooves are separated by the usual ridges 82—85. The lower side of this pressure plate 68 may be flat, but at its central portion is provided with an axially projecting cylindrical body 100, having a substantially plane thrust surface 101 surrounding the centrally located aperture 102.

The thrust surface 101 is engaged by a nut 103, which is threaded on the threaded portion 40, and which is adapted to place a predetermined pressure on the filter assembly. The end plate 68 has its aperture 102 preferably of frusto-conical form, and the projection or hub 100 is provided with radial apertures 104 communicating with the aperture 102.

The frusto-conical aperture 102 leads to a substantially circular aperture 105 at the upper surface of the end plate 68 so that the aperture 105 has a substantial fit on the rounded portions 48—51 of the bolt 13.

This locates the plate 68 with its axis substantially at the axis of the bolt and aligns its grooves 97—99 with the apertures in the filter elements, further to be described.

The annular groove 98 communicates with a series of through apertures 74 in the end plate 68 so that the medium to be filtered may pass through the end plate 68 at the apertures 74 into the filter assembly.

The filter elements, indicated by the numerals 90—95, preferably consist of replaceable, substantially cylindrical, fibrous members, such as discs of cotton or wool felt, with the fibers extending at random in all different directions, the fibers being meshed and tangled together.

The felt employed is preferably one having its fibers closely matted together so as to provide a more effective filter.

Each filter element 90—95 has a periphery 106, which is substantially cylindrical, and each filter element preferably has a flat upper surface 107 and a flat lower surface 108.

Each filter element has a centrally located aperture 109 for passing the bolt 13 and determining the position of the filter element in the assembly.

Each filter element is preferably provided with a plurality of through apertures, arranged in series, the series being indicated by the numerals 110, 111, 112. The apertures of each series 110, 111, 112 are preferably arranged along the lines of concentric circles, as shown in Fig. 4, and any desired number of apertures may be used.

There is, however, a relation between the number of apertures in the centrally located series 111 to the total number of apertures in the series 110 and 112 because the series 111 carries the unfiltered medium, while the apertures of series 110 and 112 carry the filtered medium.

Enough apertures 110 and 112 should be provided to carry away the medium to be filtered, which is conducted into the filter elements by the apertures 111 and by the medium to be filtered, which passes into the filter elements from the conduits 52—55 around the flattened portions of the bolt 13.

The operation of the filter is as follows: The device having been assembled as shown and connected with its inlet to a supply of the medium to be filtered, and with its outlet to the devices to which filtered medium is to be supplied, the medium will pass in at the inlet 19, thence through conduit 20, to counterbore 21. The unfiltered medium will then pass down through the conduits 52 formed between the cylindrical bores in the spacer members and the flattened portions of the bolt 13, and the unfiltered medium will come into contact with the filter elements at their centrally located bores 109 and pass into the filter elements at this point, as well as myriad other points.

The major portion of the medium to be filtered will, however, pass down along the bolt and out of the apertures 102 and conduits 104, into the chamber 69. All of the other filter elements, except the uppermost one, 90, are preferably of greater diameter than the spacer plates 62—66. The reason for this is to expose, in addition to the peripheral surface 106, a portion of the upper flat surface 107 and the lower flat surface 108 of each filter element to the medium to be filtered in the chamber 69. In other words, the larger sized filter elements have an increased filtering surface at their exposed outer surfaces in the chamber 69.

The lowermost pressure plate 68 or end plate blocks off the apertures 110 and 112 from supply of liquid directly through any apertures to the bottom of the assembly, but it permits liquid to pass through apertures 74 into the series of apertures 111 of the filter elements.

This direction of flow is indicated by the arrows in the drawings (Fig. 1). The middle row of apertures 111 in each filter element is thus supplied with the medium to be filtered directly from the chamber 69, but this middle row of apertures 111 is blocked off at the upper end of the assembly by the end plate 67, which has no corresponding apertures at this distance from the center of the plate.

Thus it is necessary for any liquid which passes in through the apertures 74 into the annular groove 98 and apertures 111 of the filter elements to filter through the intervening portions of the filter elements into the series of apertures 110 or 112.

The series of apertures 110 and 112 communicate at their upper ends with annular grooves 71, 81 and apertures 73, 75, and with the annular groove 24 in the body 11.

The annular groove 24 collects the filtered medium and takes it out of the filter assembly by means of the conduit 23, conduit 22, and outlet 20.

The medium to be filtered also passes through the outer portions of the filter elements from the chamber 69 into the outermost series of apertures 110 of the filter elements. The medium to be filtered also passes from the conduits 52—55 around the flat portions of the bolt 13 directly through the adjacent portions of the filter elements into the series of apertures 112.

Thus the present filter elements are so arranged with their spacer plates that the medium to be filtered passes laterally from the places where the unfiltered medium is, into the conduits or apertures 110, 112, which carry the filtered medium.

The annular grooves 76—81 in the pressure plates serve the purpose of providing continuous communication through the pressure plates and through the apertures in the filter elements, although the apertures in the filter elements do not have to be in registry with the apertures in the spacer plates.

It is only necessary for the apertures in the filter to register with the grooves of the filter plates. This they do because the grooves and apertures are located at the same radius. Thus it is not necessary for the operator to pay any attention to the registration of apertures in the filter elements and intervening plates when he is replacing filter elements.

The filter assembly preferably has a predetermined pressure placed upon the filter elements and spacer plates by means of the threaded member 103, which has a non-circular periphery, being threaded home on the threaded portion 40. The amount of this pressure depends on the pressure at which it is desired to operate the filter and the fineness of the particles which are intended to be acted upon by the filter.

It should be noted that the pressure is placed directly upon the portions of the filter which serve as filtering zones because pressure is exerted by means of ribs 82—89 on the spacer plates. These ribs are located to engage the filter elements between the apertures that carry filtered and unfiltered material. For example, the structure of the filter shown in Fig. 1, with ribs of rectangular cross section, is adapted to be used for relatively low pressures or vacuum filtering, such as, for example, from any attainable vacuum up to twenty-five pounds pressure. The vacuum attainable will naturally be limited by normal atmospheric pressure in the ordinary use of such a filter.

Referring to Fig. 7, this shows the ribs of rectangular section, which are used in such an ordinary filter.

Fig. 9 shows a modification in which the contour of the ribs has been altered so that they have an externally convex surface 114 and a flat surface 115 at the top of each ridge. The convex surface 114 and the reduced flat area 115 of each rib permits a higher unit pressure to be placed on the portions of the filter elements which these ribs engage. Furthermore, the convex surface 114 permits a kind of wedging action to take place as the filter becomes clogged, so that the filter element may have its intervening portions between pairs of ribs wedged into the space between the ribs and compressed to a still greater extent during the use of the filter.

Thus it is contemplated that such a filter as is constructed according to Fig. 9 may be used for medium pressures, such as from twenty-five to one hundred pounds per square inch.

Referring to Fig. 8, this is another modified form of spacer plate, the ribs of which have beveled surfaces 116 and relatively small flat upper portions 117. A still greater wedging portion and still greater compression may be attained by the use of such a pressure plate. It may be used for relatively high pressures, such as from one hundred pounds per square inch upward.

The pressures to which I am referring are, of course, exemplary of those which may be employed, and are not to be regarded as limitative. Such pressure is the difference in pressure between that impressed on the inlet to the filter and that at the outlet of the filter.

Referring to Fig. 10, this is a diagrammatic sectional view, showing with more clarity than Fig. 1 the direction of flow of the medium to be filtered through the device. The medium to be filtered comes in at the inlet 19, and passes through conduit 20 into bore 21. From bore 21 the medium to be filtered passes down the conduits at the flat sides of the bolt 13 and out into the chamber 69, through the tapered aperture 102 and apertures 104.

From the conduits and chambers so far described there are already a number of paths for the medium to be filtered to traverse in the act of filtering. For example, the medium may pass from the space around the bolt 13, through the filter elements into the series of conduits 112 which are closest to the bolt.

The medium may also pass from the chamber 69 into the edges of the filter elements and the upper and lower surfaces 107, 108, passing through that portion of the filter element into the series of conduits 110.

The chamber 69 is in communication with the series of conduits 111 through apertures 74 in the bottom plate, but the upper plate has no corresponding series of openings so that all the medium which passes into the series of conduits 111 must pass radially outwardly or inwardly from the series of conduits 111 to the series of conduits 112 or 110.

The two series of conduits 112 and 110 communicate with the annular groove 24 in the body at the top, which communicates with the outlet conduits 23, 22 and 20.

Figure 11:
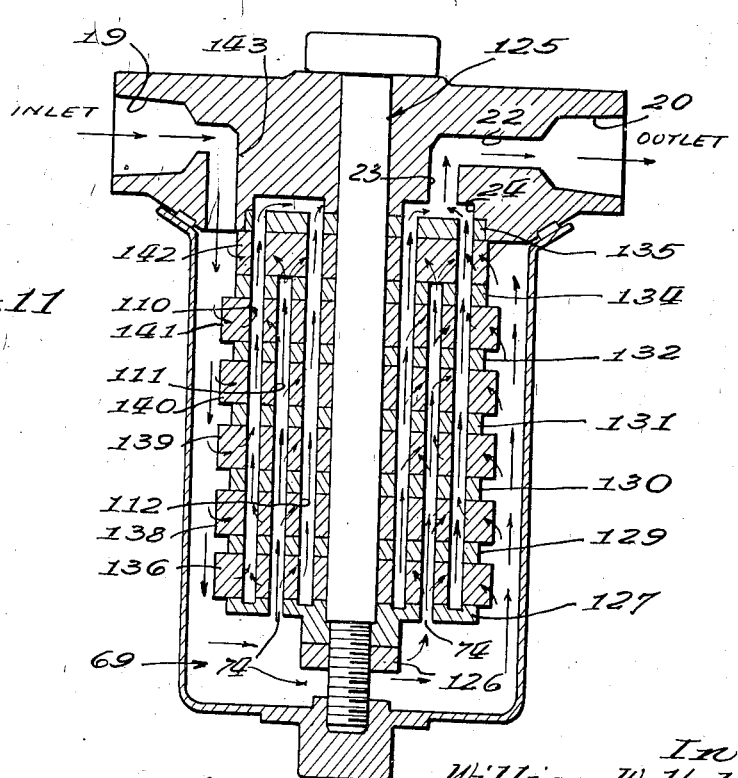
Fig. 11 is a similar diagrammatic view of a modification having a reverse flow, which can be constructed in a manner similar to Fig. 1.

Referring to Fig. 11 this is a modification shown in diagrammatic form, in which the construction may be substantially the same, but there is no conduit for the medium to be filtered surrounding the bolt 125.

Bolt 125 is a simple cylindrical bolt having a threaded end for receiving the nut 126 and the series of metal plates 127—135. The filter elements are indicated by the numerals 136—142. The arrangement is similar to that previously described in that the filters are provided with circular series of apertures 110, 111 and 112. The series of apertures 111 are in communication with the chamber 69 through an aperture 74 in the bottom plate 127. The outlet 20 communicates with conduits 22 and 23, and annular groove 24, which communicates with the series of conduits or apertures 110 and 112.

The inlet, however, indicated at 19 communicates by conduit 143 with the chamber 69. In this case the medium to be filtered enters the chamber 69 through the inlet 19 and conduit 143. From the chamber 69 the medium to be filtered passes into a series of apertures or conduits 111 in the filters and plates, and it filters radially outward or radially inward to the conduit or series 110 and 112. The medium to be filtered may also pass in from the outer edge of the filter units to the conduits 110.

Conduits 110 and 112 bearing filtered material communicate with the annular groove 24, conduit 23, conduit 22 and outlet 20.

Thus the operation in the modification of Fig. 11 is substantially the same, except that the fluid is conducted directly into chamber 69 from an inlet, and the conduit surrounding the bolt has been eliminated.

It will thus be observed that I have invented a new filter which is adapted to be used upon automotive vehicles, where space is at a premium, since the present filter provides a greater filtering area than any of the devices of the prior art, in a smaller volume.

It is also adapted to be used for oil burners, humidifying devices, or for filtering or purifying any liquids, air, or gases. Its filter elements may be very conveniently replaced, and any sediment which accumulates may be cleaned out of the bottom of the housing 15. The filter elements may be replaced without disturbing the connections to the inlet or outlet, and in case of an emergency the filter elements may be made by cutting them out of any sheet material, such as felt, cotton, or wool cloth.

The present filter is adapted to be manufactured at a low cost, and in the event it becomes clogged, it will by-pass the medium to be filtered and not entirely deprive the engine of lubrication.

While I have illustrated a preferred embodiment of my invention, many modifications may be made without departing from the spirit of the invention, and I do not wish to be limited to the precise details of construction set forth, but desire to avail myself of all changes within the scope of the appended claims.

Having thus described my invention, what I claim as new and desire to secure by Letters Patent of the United States, is:

1. In a filter, an assembly comprising a support having an inlet conduit and an outlet conduit, one of said conduits leading to an annular conduit spaced from the center of said support, and said support having a centrally located bore provided with a threaded supporting member, and the other of said two conduits leading to said centrally located bore, said supporting member having portions of its sides removed to form liquid conduits extending longitudinally of said supporting member when associated with filter elements and pressure plates, and a plurality of filter elements and pressure plates arranged alternately on said supporting member said filter elements and pressure plates having cylindrical apertures for said supporting member, said filter elements each comprising a fibrous member of substantially cylindrical shape with upper and lower flat surfaces, and having a multiplicity of through apertures, said through apertures having cylindrical walls adapted to serve as filter surfaces, said pressure plates being provided with annular grooves and through apertures to communicate with the through apertures in said filter elements, one of said pressure plates at the inlet end being closed with respect to one series of apertures in said filter elements, while the pressure plate at the other end of the assembly is open with respect to the same series of apertures in said filter elements, and a housing surrounding said filter elements and pressure plates, said housing being spaced from the filter elements, and threaded means for clamping the pressure plates against the filter elements whereby the liquid to be filtered passes in at the inlet and longitudinally of said supporting member into said housing, thence through openings in the end pressure plate into and through a series of intermediate openings in the pressure plates and filter elements, and thence laterally inwardly and outwardly toward two other series of openings in the filter elements and pressure plates, thence to an annular conduit at the other end of the assembly and out of the outlet of said filter assembly.

2. In a filter, an assembly comprising a support having an inlet conduit and an outlet conduit, one of said conduits leading to an annular conduit spaced from the center of said support, and said support having a centrally located bore provided with a threaded supporting member, and the other of said two conduits leading to said centrally located bore, said supporting member having portions of its sides removed to form liquid conduits extending longitudinally of said supporting member when associated with filter elements and pressure plates, and a plurality of filter elements and pressure plates arranged alternately on said supporting member, said filter elements and pressure plates having cylindrical apertures for said supporting member, said filter elements each comprising a fibrous member of substantially cylindrical shape with upper and lower flat surfaces, and having a multiplicity of through apertures, said through apertures having cylindrical walls adapted to serve as filter surfaces, said pressure plates being provided with annular grooves and through apertures to communicate with the through apertures in said filter elements, one of said pressure plates at the inlet end being closed with respect to one series of apertures in said filter elements, while the pressure plate at the other end of the assembly is open with respect to the same series of apertures in said filter elements, and a housing surrounding said filter elements and pressure plates, said housing being spaced from the filter elements, and threaded means for clamping the pressure plates against the filter elements whereby the liquid to be filtered passes in at the inlet and longitudinally of said supporting member into said housing, thence through openings in the end pressure plate into and through a series of intermediate openings in the pressure plates and filter elements, and thence laterally inwardly and outwardly toward two other series of openings in the filter elements and pressure plates, thence to an annular conduit at the other end of the assembly and out of the outlet of said filter assembly, the said housing being secured to said support by means of a threaded member engaging the threaded end of said supporting member.

3. In a filter, an assembly comprising a support having an inlet conduit and an outlet conduit, one of said conduits leading to an annular conduit spaced from the center of said support, and said support having a centrally located bore provided with a threaded supporting member, and the other of said two conduits leading to said centrally located bore, said supporting member having portions of its sides removed to form liquid conduits extending longitudinally of said supporting member when associated with filter elements and pressure plates, and a plurality of filter elements and pressure plates arranged alternately on said supporting member said filter elements and pressure plates having cylindrical apertures for said supporting member, said filter elements of each comprising a fibrous member of substantially cylindrical shape with upper and lower flat surfaces, and having a multiplicity of through apertures, said through apertures having cylindrical walls adapted to serve as filter surfaces, said pressure plates being provided with annular grooves and through apertures to communicate with the through apertures in said filter elements, one of said pressure plates at the inlet end being closed with respect to one series of apertures in said filter elements, while the pressure plate at the other end of the assembly is open with respect to the same series of apertures in said filter elements, and a housing surrounding said filter elements and pressure plates, said housing being spaced from the filter elements, and threaded means for clamping the pressure plates against the filter elements whereby the liquid to be filtered passes in at the inlet and longitudinally of said supporting member into said housing, thence through openings in the end pressure plate into and through a series of intermediate openings in the pressure plates and filter elements, and thence laterally inwardly and outwardly toward two other series of openings in the filter elements and pressure plates, thence to an annular conduit at the other end of the assembly and out of the outlet of said filter assembly, the said pressure plates being formed with annular ribs adapted to engage the filter elements between the annular series of apertures in said elements.

4. A filter assembly comprising a supporting body provided with a centrally located bore for receiving a threaded supporting member and having a conduit communicating with said bore, said body having a second conduit communicating with an annular groove surrounding said bore, an end pressure plate carried by said body and having two annular series of apertures for communicating with said annular groove, a plurality of filter elements and pressure plates, alternately arranged with respect to each other and with an end pressure plate at each end of the assembly, each filter element consisting of a fibrous disc having a plurality of through apertures, the apertures being arranged concentrically in a plurality of series, said pressure plates being provided with apertures for effecting communication between all of the filter elements and pressure plates, the said apertures forming conduits in said assembly extending longitudinally of said supporting member and having another end pressure plate which is provided with a series of apertures concentrically arranged for communication with an intermediate series of apertures in the pressure plates and filter element, and a housing surrounding said assembly whereby the liquid to be filtered is conducted into the housing and into predetermined of said through apertures laterally through the filter elements into others of said apertures, thence conducted to the outlet of said filter assembly.

5. A filter assembly comprising a supporting body provided with a centrally located bore for receiving a threaded supporting member and having a conduit communicating with said bore, said body having a second conduit communicating with an annular groove surrounding said bore, an end pressure plate carried by said body and having two annular series of apertures for communicating with said annular groove, a plurality of filter elements and pressure plates, alternately arranged with respect to each other and with an end pressure plate at each end of the assembly, each filter element consisting of a fibrous disc having a plurality of through apertures, the apertures being arranged concentrically in a plurality of series, said pressure plates being provided with apertures for effecting communication between all of the filter elements and pressure plates, the said apertures forming conduits in said assembly extending longitudinally of said supporting member and having another end pressure plate which is provided with a series of apertures concentrically arranged for communication with an intermediate series of apertures in the pressure plates and filter element, and a housing surrounding said assembly whereby the liquid to be filtered is conducted into the housing and into predetermined of said through apertures laterally through the filter elements into others of said apertures, hence conducted to the outlet of said filter assembly, said housing having its wall spaced from the edges of said filter elements whereby the edge faces of said filter elements may be also used as filter surfaces.

6. A filter assembly comprising a supporting body provided with a centrally located bore for receiving a threaded supporting member and having a conduit communicating with said bore, said body having a second conduit communicating with an annular groove surrounding said bore, an end pressure plate carried by said body and having two annular series of apertures for communicating with said annular groove, a plurality of filter elements and pressure plates, alternately arranged with respect to each other and with an end pressure plate at each end of the assembly, each filter element consisting of a fibrous disc having a plurality of through apertures, the apertures being arranged concentrically in a plurality of series, said pressure plates being provided with apertures for effecting communication between all of the filter elements and pressure plates, the said apertures forming conduits in said assembly extending longitudinally of said supporting member and having another end pressure plate which is provided with a series of apertures concentrically arranged for communication with an intermediate series of apertures in the pressure plates and filter element, and a housing surrounding said assembly whereby the liquid to be filtered is conducted into the housing and into predetermined of said through apertures laterally through the filter elements into others of said apertures, thence conducted to the outlet of said filter assembly, said housing having its wall spaced from the edges of said filter elements whereby the edge faces of said filter elements may be also used as filter surfaces, said supporting member having a threaded end and a threaded member engaging the adjacent pressure plate whereby a predetermined pressure may be placed upon the filter elements in accordance with the pressure requirements for filtering.

7. A filter assembly comprising a supporting body provided with a centrally located bore for receiving a threaded supporting member and having a conduit communicating with said bore, said body having a second conduit communicating with an annular groove surrounding said bore, an end pressure plate carried by said body and having two annular series of apertures for communicating with said annular groove, a plurality of filter elements and pressure plates, alternately arranged with respect to each other and with an end pressure plate at each end of the assembly, each filter element consisting of a fibrous disc having a plurality of through apertures, the apertures being arranged concentrically in a plurality of series, said pressure plates being provided with apertures for effecting communication between all of the filter elements and pressure plates, the said apertures forming conduits in said assembly extending longitudinally of said supporting member and having another end pressure plate which is provided with a series of apertures concentrically arranged for communication with an intermediate series of apertures in the pressure plates and filter element, and a housing surrounding said assembly whereby the liquid to be filtered is conducted into the housing and into predetermined of said through apertures laterally through the filter elements into others of said apertures, thence conducted to the outlet of said filter assembly, said housing having its wall spaced from the edges of said filter elements whereby the edge faces of said filter elements may be also used as filter surfaces, said supporting member having a threaded end and a threaded member engaging the adjacent pressure plate whereby a predetermined pressure may be placed upon the filter elements in accordance with the pressure requirements for filtering, and said pressure plates being provided with tapered ribs engaging said filter elements whereby the leakage between pressure plates and filter elements may be regulated by the pressure placed thereon.

8. In a filter a replaceable filter element comprising a relatively thick disc of fibrous material having upper and lower substantially flat surfaces and having a substantially cylindrical external shape, said disc being formed with a multiplicity of empty through apertures, said apertures being arranged in a plurality of series, each series being located with their centers along the line of one of a plurality of concentric circles, the circles of series of apertures including an inner circle, an intermediate circle and an outer circle, the series forming the intermediate circle having a substantially greater number of apertures than either the inner or outer series of apertures, the said apertures in each series being spaced substantially equally from each other so that a filter unit assembly may be built up of a stack of said filter elements with the apertures in each series of each filter element communicating with the apertures of similar series in the other filter elements of the stack, the external surface and the side walls of said apertures forming filter surfaces for the liquid to be filtered which passes laterally from one series of apertures or from the external surface to conduits formed by another series of apertures.

9. In a filter a replaceable filter element comprising a relatively thick disc of fibrous material having upper and lower substantially flat surfaces and having a substantially cylindrical external shape, said disc being formed with a multiplicity of empty through apertures, said apertures being arranged in a plurality of series, each series being located with their centers along the line of one of a plurality of concentric circles, the circles of series of apertures including an inner circle, an intermediate circle and an outer circle, the series forming the intermediate circle having a substantially greater number of apertures than either the inner or outer series of apertures, the said apertures in each series being spaced substantially equally from each other so that a filter unit assembly may be built up of a stack of said filter elements with the apertures in each series of each filter element communicating with the apertures of similar series in the other filter elements of the stack, the external surface and the side walls of said apertures forming filter surfaces for the liquid to be filtered which passes laterally from one series of apertures or from the external surface to conduits formed by another series of apertures, said filter element having a centrally located aperture for passing a supporting element by means of which a predetermined pressure may be placed upon the filter element.

10. In a filter the assembly of a centrally located supporting member with a plurality of rigid pressure plates and fibrous filter elements, said plates and elements being of substantially similar shape and being provided with centrally located apertures for passing said supporting member, said filter elements and plates being alternately arranged with respect to each other on said supporting member with an end pressure plate at each end of the assembly and intermediate pressure plates between filter elements, said filter elements and pressure plates being provided with empty through apertures and the apertures being arranged in a plurality of concentric circles comprising innermost, outermost, and intermediate series of apertures equally spaced from each other in said circles, the apertures in the pressure plates and filter elements communicating with each other to form a multiplicity of longitudinally extending conduits, the innermost and outermost series of conduits communicating with apertures passing through one end pressure plate and the other intermediate series of conduits communicating with the apertures passing through the other end pressure plate, the walls of predetermined of said apertures and exposed surface of the filter elements serving as filter surfaces to provide a maximum filter surface in a minimum amount of space.

11. In a filter the assembly of a centrally located supporting member with a plurality of rigid pressure plates and fibrous filter elements, said plates and elements being of substantially similar shape and being provided with centrally located apertures for passing said suporting member, said filter elements and plates being alternately arranged with respect to each other on said supporting member with an end pressure plate at each end of the assembly and intermediate pressure plates between filter elements, said filter elements and pressure plates being provided with empty through apertures and the apertures being arranged in a plurality of concentric circles comprising innermost, outermost, and intermediate series of apertures equally spaced from each other in said circles, the apertures in the pressure plates and filter elements communicating with each other to form a multiplicity of longitudinally extending conduits, the innermost and outermost series of conduits communicating with apertures passing through one end pressure plate and the other intermediate series of conduits communicating with the apertures passing through the other end pressure plate, the walls of predetermined of said apertures and exposed surface of the filter elements serving as filter surfaces to provide a maximum filter surface in a minimum amount of space, and means carried by said supporting member for placing a predetermined pressure on the assembly of pressure plates and filter elements to adapt the assembly for filtering liquids at predetermined pressure.

WILLIAM W. HALLINAN.